United States Patent [19]

Witzel et al.

[11] Patent Number: 4,961,914

[45] Date of Patent: Oct. 9, 1990

[54] METHOD OF PREPARING HYDROGEN CYANIDE

[75] Inventors: Michael Witzel, Frankfurt; Peter Kleinschmit, Hanau; Wolf-Dieter Pfeifer, Brühl, all of Fed. Rep. of Germany; Carl Voigt, Oakville, Canada; Peter Albers, Hanau-Steinheim, Fed. Rep. of Germany

[73] Assignee: Degussa Aktiengesellschaft, Frankfurt am Main, Fed. Rep. of Germany

[21] Appl. No.: 218,858

[22] Filed: Jul. 14, 1988

[30] Foreign Application Priority Data

Jul. 16, 1987 [DE] Fed. Rep. of Germany ....... 3723535

[51] Int. Cl.$^5$ .............................................. C01C 3/02
[52] U.S. Cl. .................................................... 423/376
[58] Field of Search ......................................... 423/376

[56] References Cited

U.S. PATENT DOCUMENTS

| | | |
|---|---|---|
| 3,112,215 | 11/1963 | Rousch et al. . |
| 3,577,218 | 5/1971 | Brown et al. ......................... 423/376 |
| 3,658,471 | 4/1972 | Sperka et al. ......................... 423/376 |
| 4,594,234 | 6/1986 | Manner et al. . |

FOREIGN PATENT DOCUMENTS

| | | |
|---|---|---|
| 875393 | 8/1961 | United Kingdom . |
| 958784 | 5/1964 | United Kingdom ................ 423/376 |

Primary Examiner—Wayne A. Langel
Attorney, Agent, or Firm—Cushman, Darby & Cushman

[57] ABSTRACT

As a result of a special form of the surface coating of $Al_2O_3$ catalysts using additional amounts of aluminum ions and very slight amounts of platinum ions, $Al_2O_3$ was able to be used as catalyst for continuous operation (150 days and longer) in the preparation of hydrogen cyanide from hydrocarbons and ammonia, preferably in the BMA method.

9 Claims, No Drawings

METHOD OF PREPARING HYDROGEN CYANIDE

The present invention relates to the preparation of hydrogen cyanide (prussic acid) according to the BMA method (prussic acid - methane - ammonia method) with a catalyst which is superior to those used in the past.

BACKGROUND OF THE INVENTION

In the BMA method for the manufacture of hydrogen cyanide, a gaseous mixture of methane and ammonia is reacted by passing it through suspended reaction tubes whose inner surfaces are covered with a layer of noble metal, preferably platinum and aluminum, at temperatures in the range of approximately 1000° to 1350° C. See, e.g., Ullmann, "Enzyklopädie der technischen Chemie" [Encyclopedia of Industrial Chemistry], 4th edition, vol. 9, page 659, (1975).

German Patent DE-PS No. 10 68 681 describes a modification of this method in which a non-metallic contact mass such as aluminum oxide is used. This method provides advantageous yields of hydrogen cyanide at the start of the reaction. However, in the course of the reaction, aluminum nitride is formed and the catalytic activity of the aluminum oxide diminishes sharply.

However, a coating of noble metal, e.g. platinum, deposited on the surface of the aluminum oxide, should neutralize this influence of the aluminum nitride.

The formation of aluminum nitride during the usage of $\alpha$-aluminum oxide was evaluated more favorably in later methods, e.g. that of EP No. 0,088,988; however, an addition of sulfur compounds was considered to be absolutely necessary. The sulfur compounds, which were foreign to the system for the preparation of hydrogen cyanide, are added at the outset in a gaseous form to the initial mixture and must be intro duced constantly during the reaction. As a consequence, the hydrogen cyanide product is contaminated with sulfur compounds.

In spite of these efforts to reduce the performance drop of $Al_2O_3$ as a catalyst in the preparation of prussic acid, the working times of the catalyst were at the most 10 days - that is, $Al_2O_3$ did not appear to be suitable for a continuous operation.

SUMMARY OF THE INVENTION

The object of the present invention is to provide an improved catalyst for the manufacture of hydrogen cyanide by the BMA method, starting with aluminum oxide, especially in continuous operation.

In accordance with the invention, it has been found that this object can be achieved if the preparation of hydrogen cyanide from aliphatic hydrocarbons with 1–4 carbon atoms and ammonia according to the so-called BMA method is first performed using a preliminary catalyst stage. The preliminary catalyst stage employs, as a catalyst, a material obtained by applying aluminum ions and very small amounts of noble metal ions, preferably platinum ions, to the surface of molded bodies of aluminum oxide from a solution. This preliminary catalyst is dried and then reduced with hydrogen. Then the preliminary catalyst obtained in this manner is introduced into a hydrogen cyanide reactor, the reactor is heated to temperatures of 1000 to 1350.C, a mixture of ammonia and hydrocarbon customary for the BMA method is introduced into the reactor and the reaction to hydrogen cyanide is initiated with the preliminary stage catalyst. After a brief reaction time on the surface of the preliminary stage catalyst, a cohesive layer of aluminum nitride forms in situ. Then the reaction may be continued in conventional manner.

The term aliphatic hydrocarbons containing 1-4 carbon atoms denotes methane, ethane, propane and butane. Methane is preferred.

Pd, Ir, Rh are precious metals which can be used in making the preliminary stage catalyst, but platinum is preferred.

Commercial $\alpha$- or -aluminum oxide is used as aluminum oxide for the preliminary form of the catalyst. Commercial aluminum oxide pellets and also coarse aluminum oxide granulate can be used as molded bodies. However, tubes of $\alpha$-aluminum oxide are preferred as molded bodies, the catalyst being applied to the inner surface of such tubes in a known manner, cf. e.g. DE-PA No. 919 768 or DE-PS No. 30 34 957 (corresponding to U.S. Pat. Nos. 4,415,485 and 4,471,712).

The very slight amount of platinum provided for the catalyst solution can be used in a customary form, e.g. as hexachloroplatinate or also as alkali tetrachloroplatinate.

Aluminum salts which are readily soluble in water such as, e.g., chloride, nitrate or sulfate supply the aluminum ions.

The molar ratio of platinum to aluminum in the catalyst solution should be between 0.001 to 1 up to 0.1 to 1, preferably between 0.01 up to 0.1 to 1. The catalyst solutions, which are preferably aqueous, contain platinum ions in low concentration, that is, in amounts of 0.5 to 5% by weight. The appropriate amounts of aluminum ions are used in accordance with the molar ratios mentioned above.

The pellets or granulates may be coated according to known methods, e.g. by pouring the catalyst solution over these molded bodies, and subsequently separating the molded bodies from the solutions, followed by drying at a rather high temperature and reduction in a hydrogen current, cf. DE-PS No. 1 068 681.

The inner coating of the tubes is performed, as stated, either manually or mechanically according to the method described in German patents Nos. 919 768 or 30 34 957. The dried and reduced preliminary stage (preliminary form) is introduced, preferably in the form of the tubes coated on the inside, into the reactor of the BMA method in a customary manner as suspended tubes. After the preliminary stage of the catalyst has been introduced into the BMA reactor and it has been heated to reaction temperature, a gaseous mixture of ammonia and hydrocarbon customary for the BMA method is introduced into the tube; after a start-up time, that is, usually after half an hour to one hour after the reaction start, the inner surface of the reaction tubes has been converted to as aluminum nitride. That is, the preliminary catalyst stage has been converted by this step into the final catalyst form. This final form is suitable for continuous operation as shown in the examples which follow.

The method of the invention provides a catalyst suitable for continuous operation formed from aluminum oxide and based on aluminum nitride without other components, such as the sulfur compounds mentioned above, being added to the gaseous mixture of ammonia and hydrocarbon component. Regeneration cycles for reestablishing the full catalytic activity with pure hydrogen or ammonia are necessary in extremely rare instances, if at all. Moreover, the catalyst of the invention reduces the amount of precious metal (preferably platinum) which is required.

DETAILED DESCRIPTION OF PREFERRED EMBODIMENTS

The invention will now be described in detail in the following examples, which are provided by way of illustration, no limitation thereto being intended. First, the impregnation of pellets and the inner coating of the tubes will be described in more detail.

The results for the BMA method given below using the catalyst of the invention were performed in a test apparatus which was patterned after the known BMA apparatus; it consisted of a reaction chamber equipped with appropriate means for heating and devices for the introduction and analysis of gas (Dechema-Monographie Vol 33, (1959) pp. 28–46).

The pellets of aluminum oxide were placed into a 750 mm long quartz tube located in a vertically arranged tubular furnace in such a manner that they were located in the heatable zone of the furnace.

The initial gaseous mixture of ammonia and methane was introduced in a stoichiometric ratio at the lower end of this quartz tube and conducted over the pellets. The mixing ratio was assured by regulating the flow rates. After the conversion of the reaction components in a range of 1250°–1350° C., the product gases hydrogen cyanide and hydrogen were first passed through a gas meter for determining the volume and subsequently determined in a known manner by titration (by absorption of the non-reacted ammonia in sulfuric acid and of the hydrogen cyanide in aqueous sodium hydroxide solution). The pressures in front of and after the reaction chamber were measured with U-tube manometers.

The tests with suspended tubes which had been coated on their interior were performed in the same apparatus, but the pellet filled quartz tubes were replaced by the coated tubes.

(A) Coating of the pellets:

The coating method for pellets with an aqueous solution containing platinum and aluminum in a molar ratio of platinum atom to aluminum ion of 0.1 to 1 is described as an example.

6 g $H_2PtCl_6 \times 6H_2O$ (11.59 mmoles platinum, i.e., 2.26 g platinum) and 27.97 g $AlCl_3 \times 6H_2O$ (115.9 mmoles, i.e., 3.12 g aluminum) are dissolved in 50 ml $H_2O$ and added in a 500 ml single-neck round flask to 44 g (40 g+4 g for X-ray diffraction) moist pellets. The solvent is removed in a rotary evaporator under a vacuum and the salt mixture is applied in this manner onto the pellets. The after-drying is performed in a tubular furnace at 200° C. in a current of nitrogen. For reduction, the temperature is raised in ▲ steps of 100° C. to 800° C. and reduced thereby with 40 l/h $H_2$. The catalytic loading is subsequently determined by differential weighing.

Solutions having other concentrations are prepared and used in a corresponding manner.

(B) Inner coating of the BMA tubes

The same apparatus as in (A) was used with except that, instead of coating pellets, $\alpha$-$Al_2O_3$ ceramic tubes were used. The coating took place with aqueous solutions which corresponded to those used for coating pellets.

Aqueous solutions with molar ratios of platinum atom to aluminum ion of 0.1 to 1 up to 0.001 to 1 were used for methods (A) and (B).

The particular amount of catalyst applied was 5 g (of platinum ion+aluminum ion) for a carrier mass of aluminum oxide of approximately 40 g.

The following parameters were established as a base for all examples:
Surface of the carrier: 1120 cm$^2$
Temperature of the furnace: 1250° C.–1300° C.
Throughput: 1 mole $CH_4$+1.1 mole $NH_3$/h
Coating procedure: 1 time The running time (operating time) differed in the individual examples.

EXAMPLE 1

A pellet fill coated with a solution with a Pt/Al ratio of 0.1:1 resulted, after 5 days operating time, in a yield of hydrogen cyanide of 92% in relation to the methane added.

EXMAPLE 2

The amount of platinum used in the coating of the pellets was reduced to a tenth of the amount in Example 1. (molar ratio Pt/Al=0.1:1).

After 5 days operating time, a yield of 92% hydrogen cyanide in relation to methane was also obtained in this instance.

The conversion of aluminum oxide to aluminum nitride was followed, in both of the foregoing examples, with the aid of X-ray diffraction according to the method in H. Krischner, "Einführung in die Röntgenstrukturanalyse" [Introduction to X-Ray Structural Analysis], Vieweg-Verlag, Braunschweig, 1974.

The following Examples 3 and 4 were performed in the test apparatus patterned after a BMA apparatus.

EXAMPLE 3

The platinum-aluminum in the inner coating of the tubes corresponded to the molar ratio Pt/Al=0.01:1. After a running time of 20 days, the catalyst was still unchanged and active. The yield of hydrogen cyanide was 90% in relation to methane.

EXAMPLE 4

Example 3 was repeated, but the molar ratio of Pt/Al in the inner coating of the tubes was 0.001:1. After 20 days, the yield was still 91% in relation to methane. However, if the molar ratio of Pt/Al was lowered to 0:1, synthesis of hydrogen cyanide was no longer possible.

EXAMPLE 5

The molar ratio of Pt/Al was adjusted to 0.1:1 in an operating test in a plant system with a 26-tube chamber. Even after an operating time of 150 days (5 months), no diminution of the activity in the action of the catalyst of the invention could be determined. The yield was constant, in this instance, at 88% in relation to methane.

The analytic investigations on the inner surfaces of the tubes in examples 3–5 were not performed with an integral X-ray diffraction method but rather by the Esca method, relevant for heterogeneous catalysis, cf. Ullmann, Enzyklopädie der technischen Chemie, 4th ed., vol. 5, p. 519 ff. It was determined by this method, particularly in the operating test, that a cohesive layer of aluminum nitride was present on the inner surface of the tubes.

Thus, the invention provides a catalyst based on aluminum nitride with a durability of 15 to 50 the durability which was possible with the state of the art, cf. e.g.

DE-PS No. 1 068 681 and EP-PS No. 088 988. No change in the composition of the initial mixture of reaction gases is necessary for this.

What is claimed is:

1. A method of preparing hydrogen cyanide with the so-called BMA method by reacting aliphatic hydrocarbons having 1-4 carbon atoms with ammonia in the presence of a catalyst, said method comprising the following steps:
    (1) forming a preliminary catalyst stage by applying aluminum ions and noble metal ions to the surface of a molded body of aluminum oxide from a catalytic solution, wherein the ratio of the noble metal ions to the aluminum ions in the catalystic solution is between 0.001 to 1 up to 0.1 to 1, drying the molded body and reducing with hydrogen,
    (2) introducing the preliminary catalyst stage obtained in this manenr into a hydrogen cyanide reactor,
    (3) heating the reactor to a temperature in the range of 1000° to 1350° C.,
    (4) introducing a mixture of ammonia and hydrocarbon in amounts approximately in accordance with the stoichiometry of their reaction into the reactor,
    (5) initiating the reaction to hydrogen cyanide with the preliminary catalyst stage, and
    (6) continuing this reaction, for one-half to one hour after start-up time, until there is formed a cohesive layer of aluminum nitride in situ.

2. A method as set forth in claim 1 in which the hydrocarbon is methane.

3. A method as set forth in calim 1 or cliam 2 in which the molded body is $\alpha$-aluminum oxide.

4. A method as set forth in claim 1 or claim 2 in which a hexachloroplatinate solution is used as noble metal solution.

5. A method as set forth in claim 1 or claim 2 in which a chloride, nitrate or sulfate of aluminum is used in said solution.

6. A method as set forth in claim 1 or claim 2 in which the molar rati of noble metal ions to aluminum ions in said solution is in the range of 0.01 to up to 0.1 to 1.

7. A method as set forth in claim 1 or claim 2 in which said solution contains 0.5 to 5% by weight platinum ions.

8. A method as set forth in claim 1 or claim 2 in which $\alpha$-aluminum oxide tubes are used as molded bodies and said solution is applied to the inner surface of said tubes.

9. A method as set forth in claim 1 in which the noble metal ions are platinum ions.

* * * * *